Patented Aug. 14, 1945

2,382,793

UNITED STATES PATENT OFFICE 2,382,793

PRODUCTION OF SULPHENE AMIDES

Louis H. Howland, Waterbury, Conn., assignor to United States Rubber Company, New York, N. Y., a corporation of New Jersey No Drawing. Application April 8, 1943,
Serial No. 482,338

9 Claims. (Cl. 260—306.6)

This invention relates to the improvements in the production of sulphene amides.

An object of this invention is to provide a new method for the preparation of certain substituted sulphene amides which comprises displacing the amide group of a thiazyl sulphene amide having an unsubstituted amide (—$NH_2$) group, by reaction with an amine stronger than ammonia. Ammonia is split off during the reaction, symbolized, respectively, as follows:

I   T—S—$NH_2$+$RNH_2$→TSNHR+$NH_3$
II  T—S—$NH_2$+$R_2NH$→$TSNR_2$+$NH_3$

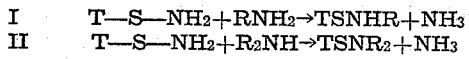

T represents a thiazole nucleus; R is a hydrocarbon group (substituted or unsubstituted).

By an amine stronger than ammonia is meant an amine having at least one hydrogen atom attached to an amine nitrogen atom, whose dissociation constant is greater than $1.8 \times 10^{-5}$ at 25° C., and particularly the primary and secondary aliphatic amines, whether or not the aliphatic group is of the open-chain or closed-chain (alicyclic) series such as the cyclo-paraffins sometimes called the polymethylenes. The symmetrical branched open-chain primary amines such as isopropylamine, confer on the resulting product unusual properties of high melting point and stability, and are therefore preferred amines for the purposes of the invention. The hydrocarbon groups may be saturated or unsaturated, and be substituted by non-hydrocarbon radicals such as chlorine, amino, hydroxy, etc. They may also be joined in ring formation with the amine nitrogen atom, as in piperazine, morpholine, etc.

To carry out the reaction the unsubstituted sulphene amide is mixed with the amine stronger than ammonia. In the course of the reaction ammonia is eliminated and the rate of evolution of ammonia is a measure of the progress of the reaction. The ammonia may be recovered, if desired.

A solvent is often convenient to facilitate mixing of the reactants and should be inert. In many cases, however, an excess of amine may be used as a solvent. The reaction may be carried out in a water suspension or in a mixed solvent such as alcohol-water mixtures or in a solvent immiscible with water. The preferred reactant ratio is to use an excess of the amine in the reaction.

Exemplary of amines for the purpose of reacting with any thiazyl sulphene amide, as described, are the following: methyl amine, ethyl amine, propyl amine, isopropyl amine, butyl amine, amyl amine, lauryl amine, allyl amine, methallyl amine, benzyl amine, cyclohexyl amine, p-methyl cyclohexyl amine, o-cyclohexyl cyclohexyl amine, 2.5-endomethylene delta-3-tetra hydro benzyl amine, b-methoxy ethyl amine, ethanol amine, ethylene diamine, diethyl amino ethyl amine, iso amyl amine, iso butyl amine, sec-amyl amine, bornyl amine, hexa hydro benzyl amine, b-chloro ethyl amine, heptyl amine, octyl amine, tertiary butyl amine; dimethyl amine, diethyl amine, dipropyl amine, dibutyl amine, dibenzyl amine, dicyclohexyl amine, diamyl amine, morpholine, piperidine, piperazine, diallyl amine, dimethallyl amine, methyl butyl amine, methyl cyclohexyl amine, ethyl benzyl amine, ethylene imine, propylene imine, butylene imine, hexamethylene imine, hepta methylene imine, diethylene triamine, triethylene tetramine, polyethylene polyamine, b-dimethyl amino diethyl amine, ethanol ethyl amine, and propanol propyl amine.

Exemplary of thiazyl sulphene amides which may be reacted with any of the amines stronger than ammonia, as aforesaid, are the following: benzothiazyl 2-sulphene amide, naphthothiazyl 2-sulphene amide, 6-chloro-benzothiazyl 2-sulphene amide, 4-ethoxy-benzothiazyl 2-sulphene amide, 6-phenyl-benzothiaxyl 2-sulphene amide, 6-nitro-benzothiazyl 2-sulphene amide, 4-methyl-benzothiazyl 2-sulphene amide, 5-ethyl-benzothiazyl 2-sulphene amide, 6-tertiary butyl-benzothiazyl 2-sulphene amide, thiazyl 2-sulphene amide, 4,5-dimethyl thiazyl 2-sulphene amide, 4,5-diethyl thiazyl 2-sulphene amide, 4-methyl thiazyl 2-sulphene amide, 4-ethyl thiazyl 2-sulphene amide, 4-butyl thiazyl 2-sulphene amide, and 5-ethyl thiazyl 2-sulphene amide.

Suitable solvents for the process include the following: methanol, ethanol, propanol, butanol, formamide, dimethyl formamide, ether, dioxane, benzene, chlorobenzene, xylene, toluene, glycol monomethyl ether, and glycol diethyl ether.

The following examples, in which the parts are by weight, further illustrate the invention:

*Example 1.—Benzothiazyl 2-sulphene amide-cyclohexyl amine*

A mixture of 27.3 g. benzothiazyl 2-sulphene amide and 23 g. cyclohexyl amine is prepared. As the mixture is stirred it foams due to the evolution of ammonia and becomes quite fluid. After a short time the mixture thickens and forms a crystalline mass. The crude product after trituration with water and drying melts 90–96° C., which on recrystallation from dilute alcohol melted 99-101° C. Yield of crude cyclohexyl benzothiazyl 2-sulphene amide—37 g.

*Example 2.—Benzothiazyl 2-sulphene amide-cyclohexyl amine*

Benzothiazyl 2-sulphene amide (18.2 g.) and water (75 cc.) are stirred into a thick paste. To the paste, 23 cc. cyclohexyl amine is added and the mixture allowed to stand. In the course of a few hours the solid phase coagulates. After standing overnight the solid material is filtered off and washed several times by trituration with water. The wet filter cake is divided into two moieties. One is allowed to dry and amounts to 8.5 g. melting 95-102° C. The other is recrystallized from alcohol and amounts to 11.7 g. melting 101-101.5° C. Both portions are essentially cyclohexyl benzothiazyl 2-sulphene amide.

*Example 3.—Benzothiazyl 2-sulphene amide-ethyl amine*

To a suspension of 7.3 g. benzothiazyl 2-sulphene amide in 100 cc. methanol, a solution of 1.81 g. ethyl amine in 13.3 cc. methanol is added. The benzothiazyl sulphamine gradually passes into solution with the evolution of ammonia. After standing several hours the solution is filtered, diluted with water and extracted with ether. The ether extract is washed with water, dried over sodium sulphate, filtered and evaporated under reduced pressure. A yield of 7 g. of a dark oil is obtained which gradually solidifies. On recrystallization from petroleum ether (B. P. 70-90° C.) the product forms colorless crystals melting at 52-53° C. consisting of N-ethyl benzothiazyl 2-sulphene amide.

*Example 4.—Benzothiazyl 2-sulphene amide-ethylene diamine*

To a suspension of 7.3 g. benzothiazyl-2-sulphene amide in 50 cc. methanol 5 cc. ethylene diamine is added. During an overnight stand ammonia gradually evolves and the benzothiazyl 2-sulphene amide passes into solution. After filtering from a small amount of suspended matter the solution is diluted with water and the separated oil allowed to solidify. The product after triturating with water and drying melted 122-123° C. It is N-b-ethyl benzothiazyl 2-sulphene amide.

*Example 5.—Benzothiazyl 2-sulphene amide and isopropyl amine*

To a suspension of 11 g. benzothiazyl 2-sulphene amide in 100 cc. methanol, 10 cc. isopropyl amine is added. The addition of the amine causes a slight warming of the mixture. For an hour the reaction mixture was maintained at 35° C. and then filtered from a small amount of insoluble material. Upon diluting the filtrate with water isopropyl benzothiazyl 2-sulphene amide separates. Yield 12.2 g. Melting range 88-94° C. A recrystallization from petroleum ether (B. P. 70-90° C.) raises the melting point to 93-94° C.

*Example 6.—Benzothiazyl 2-sulphene amide and benzylamine*

A solution of 10 gr. benzothiazyl 2-sulphene amide and 6 gr. benzylamine in 25 cc. benzene is heated to boiling and then cooled. The red oily precipitate dries quickly to a red powder and amounts to 9.7 grams melting 109-113° C. On recrystallization from benzene 7.2 g. of a pink powder melting 111-114° C. is obtained. It is N-benzyl benzothiazyl 2-sulphene amide.

| Analysis | Calculated | Found |
| --- | --- | --- |
| Nitrogen | Per cent 10.3 | Per cent 10.25 |

*Example 7.—Benzothiazyl 2-sulphene amide and morpholine*

Benzothiazyl 2-sulphene amide (25.3 g.) is mixed with 19.7 g. morpholine. The stirred mixture rapidly liquefies and evolves ammonia. After a short time the mixture sets to a thick mush. It is purified by trituration with water and with alcohol before drying. Yield 25 gr. of oxydiethylene benzothiazyl 2-sulphene amide melting 83-85° C. A recrystallization from alcohol raises the melting point to 86-87° C.

*Example 8.—Benzothiazyl 2-sulphene amide-piperidine*

A mixture of 27.3 gr. benzothiazyl 2-sulphene amide and 22.5 cc. piperidine is allowed to stand overnight and is then diluted with water. The oil that separates is stirred with fresh water and then crystallized by allowing to stand under acetone. N-pentamethylene benzothiazyl 2-sulphene amide is obtained in a yield of 19 g. melting 73-75° C. One recrystallization from dilute methanol raises the melting point to 77-79° C.

*Example 9.—Benzothiazyl 2-sulphene amide-diethyl amine*

To 18.2 gr. benzothiazyl 2-sulphene amide 20.4 cc. diethyl amine is added. The mixture rapidly liquifies and evolves ammonia. After standing an hour ether is added and the ether solution washed several times with water, dried over anhydrous sodium sulphate and filtered. The ether is allowed to evaporate by standing overnight in an open beaker. Yield, 10 gr. of a brown oil consisting substantially of N-diethyl benzothiazyl 2-sulphene amide.

*Example 10.—Benzothiazyl 2-sulphene amide-dipropyl amine*

To a slurry of 18.3 gr. benzothiazyl 2-sulphene amide in 100 cc. methanol, 13.7 cc. di n-propyl amine is added. The mixture after standing 15 hours (overnight) is substantially liquid and the odor of ammonia is strong. The solid material which is present is filtered off. It consists of dibenzothiazyl disulphide and amounts to 2 gr. The filtrate is diluted with water, extracted with ether and the ether extract washed with water, dried and evaporated under reduced pressure. From the residue after standing for a short time an additional 1.0 gr. dibenzothiazyl disulphide separates and is removed by filtration. The filtrate is a brown oil amounting to about 16 gr. It is N-di n-propyl benzothiazyl 2-sulphene amide.

*Example 11.—Benzothiazyl 2-sulphene amide-dibutyl amine*

To a suspension of 18.3 gr. benzothiazyl 2-sulphene amide in 100 cc. methanol, 16.8 cc. technical dibutyl amine is added. On standing overnight most of the solid material passes into solution. The small amount of insoluble material is removed by filtration and consists of 2 gr. dibenzothiazyl disulphide. The alcoholic filtrate on dilution with water separates an oil which is taken up in ether, washed well with water, dried and evaporated at 40° C. under reduced pressure.

A yield of 20 gr. N-dibutyl benzothiazyl 2-sulphene amide, as a clear brown oil is obtained.

Having thus described my invention, what I claim and desire to protect by Letters Patent is:

1. A method of preparing sulphene amides which comprises reacting a thiazyl 2-sulphene amide having an unsubstituted amide group with an amine stronger than ammonia and having at least one replaceable hydrogen atom.

2. A method of preparing sulphene amides which comprises reacting a thiazyl 2-sulphene amide having an unsubstituted amide group with an aliphatic amine stronger than ammonia and having at least one replaceable hydrogen atom, with accompanying elimination of ammonia during the reaction.

3. A method of preparing sulphene amides which comprises reacting a thiazyl 2-sulphene amide having an unsubstituted amide group with an open-chain aliphatic amine stronger than ammonia and having at least one replaceable hydrogen atom.

4. A method of preparing sulphene amides which comprises reacting a thiazyl 2-sulphene amide having an unsubstituted amide group with an alicyclic amine stronger than ammonia and having at least one replaceable hydrogen atom.

5. A method of preparing sulphene amides which comprises reacting a thiazyl 2-sulphene amide having an unsubstituted amide group with a heterocyclic amine stronger than ammonia and having at least one replaceable hydrogen atom.

6. A method of preparing sulphene amides which comprises reacting an arylene thiazyl 2-sulphene amide having an unsubstituted amide group with an amine stronger than ammonia and having at least one replaceable hydrogen atom.

7. A method of preparing sulphene amides which comprises reacting an arylene thiazyl 2-sulphene amide having an unsubstituted amide group with isopropylamine.

8. A method of preparing sulphene amides which comprises reacting an arylene thiazyl 2-sulphene amide having an unsubstituted amide group with cyclohexylamine.

9. A method of preparing sulphene amides which comprises reacting an arylene thiazyl 2-sulphene amide having an unsubstituted amide group with diethylamine.

LOUIS H. HOWLAND.